Patented Sept. 2, 1947

2,426,912

UNITED STATES PATENT OFFICE 2,426,912

PROCESS OF HYDROLYZING DIMETHYLDI-HALOGENOSILANES

James G. E. Wright, Alplaus, N. Y., assignor to General Electric Company, a corporation of New York No Drawing. Application April 26, 1944, Serial No. 532,880

7 Claims. (Cl. 260—607)

The present invention relates to a process of hydrolyzing dimethyldihalogenosilanes. It is particularly concerned with a process of hydrolyzing a dimethyl dihalogenosilane, e. g. dimethyldichlorosilane, dimethyldibromosilane, etc., to obtain a hydrolysis product composed substantially of dimethyl silicones boiling above 200 deg. C. Specifically, it is concerned with the preparation of dimethyl silicones for the preparation of silicone elastomers such as are described herein and in the copending application of Maynard C. Agens, Serial No. 526,473, and the application of James G. E. Wright and C. S. Oliver, Serial No. 526,472, filed March 14, 1944, and assigned to the same assignee as the present invention.

The hydrolysis of a dimethyldihalogenosilane, such as dimethyldichlorosilane, is most readily carried out by pouring it into water. The product of hydrolysis, polymeric dimethyl silicone, is an oily liquid which floats on the surface of the other product of hydrolysis, hydrochloric acid. The dimethyl silicone may then be separated from the acid by decantation. In general, dimethyl silicone prepared by this procedure contains a large proportion of the tetramer, octamethylcyclotetrasiloxane, boiling at 175 deg. C., along with lesser amounts of trimer boiling at 134 deg. and the pentamer, boiling at 210 deg. C., and others. From a third to a half of the total product may be distilled at about 200 deg. C. or below, and is thus comparatively volatile.

An object of the present invention is to provide a method of hydrolysis of a dimethyl dihalogenosilane of the type described in the above-mentioned applications which yields a polymeric dimethyl silicone of high molecular weight and containing a minimum of polymers boiling below 200 deg. C.

Another object of the invention is to provide a process of hydrolyzing a dimethyldihalogenosilane which will yield viscous hydrolysis products which can be readily converted to a gum suitable for the preparation of silicone elastomers.

I have found that the above and other objects which will become apparent from the following description of my invention can be attained by employing as the hydrolysis medium a solution of a soluble salt of a metal of the first and second groups of the periodic table, preferably a soluble salt of the alkali or alkaline earth metals. Examples of suitable salts are sodium chloride, sodium carbonate, sodium sulphate, calcium nitrate, zinc chloride, copper sulphate, potassium carbonate, magnesium sulphate, etc. The hydrolysis mediums useful for the practice of the present invention should contain sufficient dissolved salt to have a specific gravity of at least about 1.10. With many of the salts, saturated or substantially saturated solutions are preferred. In carrying out the hydrolysis, the dimethyldihalogenosilane is allowed to run onto the surface of the salt solution while the solution is being gently swirled around, for example by means of a propeller sunk deep in the solution. Violent turbulent agitation of the salt solution is to be avoided. The addition of halogenosilane is stopped when the upper silicone layer has become very viscous. In some cases, for example when alkali or alkaline earth carbonates are employed, the hydrolysis medium changes from alkaline to acid at approximately the same point. The viscous liquid product contains only a small quantity of material boiling below 200 deg. C., generally less than about 10 per cent.

For the purpose of illustrating the invention, the hydrolysis of dimethyldichlorosilane by means of a substantially saturated solution of sodium carbonate will be specifically described. The use of solutions of the carbonates of alkali and alkaline earth metals has been found to produce hydrolysis products which can be readily converted to a rubber-like state by treatment with iron halides, for example hydrated ferric chloride, as described in the above-mentioned Wright and Oliver application.

A substantially saturated solution of sodium carbonate was placed in a container and dimethyldichlorosilane was slowly dropped from a funnel onto the surface of the liquid. The aqueous medium and hydrolyzate were stirred gently by a stirrer projecting below the surface of the aqueous medium. The stirring was gentle enough to prevent any appreciable dispersion of the dimethyldichlorosilane or the oily silicone liquid product in the aqueous medium. Consequently, after the early stage of hydrolysis the dimethyldichlorosilane was dispersed or dissolved in the silicone oily layer before it or any products formed by reaction of dimethyldichlorosilane and the silicone oil came in contact with the aqueous layer. The aqueous phase finally became acid and at this point the addition of dichlorosilane was stopped. When the hydrolysis product is to be used in the manufacture of a silicone elastomer, the oily hydrolysis product need not be washed. It is merely decanted from the hydrolysis medium and polymerized even though it may contain some unhydrolyzed dichloride and smell faintly of hydrochloric acid.

A comparison of hydrolysis products prepared as described herein with hydrolysis products prepared either by use of water as the hydrolysis medium or by use of a solution of an alkaline salt, such as sodium carbonate, accompanied by sufficient agitation of the hydrolysis medium to mix the silicon halide and oily silicone product with the medium during hydrolysis has shown that the products of the present invention are far more viscous and contain much smaller amounts of low boiling silicones than do the products of either of the other processes.

Methods for converting the high molecular weight hydrolysis products produced in accordance with the present invention to gums for use in the preparation of elastomers are described in the Agens application and the Wright and Oliver application mentioned hereinbefore. Iron halides, such as ferrous or ferric chloride are ordinarily added to the oily hydrolysis products in the form of alcoholic solutions in amounts not exceeding about one per cent by weight of the iron salt based on the weight of the oil. The iron chloride solution is stirred into the oil and the mixture set aside to convert it to a gum suitable for use in the preparation of elastomers.

What I claim as new and desire to secure by Letters Patent of the United States is:

1. The process of hydrolyzing a methylhalogenosilane consisting substantially of a dimethyldihalogenosilane which comprises flowing said methylhalogenosilane onto the surface of a hydrolysis medium in a manner such that there is no appreciable dispersion of the dimethyldihalogenosilane or its hydrolysis products in the hydrolysis medium, the said hydrolysis medium being an aqueous solution consisting substantially of water having dissolved therein a salt of a metal selected from the group consisting of the metals of the first and second groups of the periodic table, the said solution having a specific gravity of at least 1.1.

2. The process of claim 1 wherein the dimethyldihalogenosilane is dimethyldichlorosilane.

3. The process of hydrolyzing a methyl chlorosilane consisting substantially of dimethyldichlorosilane which comprises slowly pouring said methylchlorosilane onto the surface of a gently swirling aqueous solution having a specific gravity of at least 1.1 and consisting of water having dissolved therein a salt of a metal selected from the group consisting of the metals of the first and second groups of the periodic table, the swirling action being sufficiently gentle to prevent any appreciable dispersion of the dimethyldichlorosilane or its hydrolysis products in the aqueous solution.

4. The process of hydrolyzing a methylhalogenosilane consisting substantially of a dimethyldihalogenosilane which comprises slowly pouring the said methylhalogenosilane onto the surface of an aqueous solution having a specific gravity of at least 1.1 and consisting of water having dissolved therein a salt of an alkali metal in such a manner that the dimethyldihalogenosilane and its hydrolysis products float on the surface of the aqueous solution with no appreciable dispersion thereof in said aqueous solution.

5. The process of hydrolyzing a methylhalogenosilane consisting substantially of a dimethyldihalogenosilane which comprises slowly pouring the said methylhalogenosilane onto the surface of an aqueous solution consisting of water having dissolved therein a salt of an alkali metal so that there is no appreciable dispersion of said dimethyldihalogenosilane and its hydrolysis products in the aqueous solution, said solution being substantially saturated and its density being at least 1.1.

6. The process of hydrolyzing a methylchlorosilane consisting substantially of dimethyldichlorosilane which comprises slowly pouring the said methylchlorosilane onto the surface of an aqueous solution consisting of water having sodium carbonate dissolved therein while the said solution is being gently swirled in a manner to avoid any appreciable dispersion of the dimethyldichlorosilane or its hydrolysis products in the aqueous solution, the said solution having a specific gravity of at least 1.1.

7. A process as in claim 4, wherein the alkali-metal salt is an alkali-metal carbonate.

JAMES G. E. WRIGHT.

REFERENCES CITED

The following references are of record in the file of this patent:

UNITED STATES PATENTS

| Number | Name | Date |
|---|---|---|
| 2,208,857 | Schlack | July 23, 1940 |
| 2,258,218 | Rochow | Oct. 7, 1941 |
| 2,313,767 | Pollack | Mar. 16, 1943 |

OTHER REFERENCES

Robison et al., Journ. Chem. Soc. London, vol. 101, 1912, pages 2146 and 2147.